(12) United States Patent
Li

(10) Patent No.: US 10,812,197 B1
(45) Date of Patent: Oct. 20, 2020

(54) PULSED SAGNAC LOOP PHASE-MODULATED MICROWAVE PHOTONIC LINK

(71) Applicant: The University of Massachusetts, Boston, MA (US)

(72) Inventor: Yifei Li, Dartmouth, MA (US)

(73) Assignee: UNIVERSITY OF MASSACHUSETTS, Boston, MA (US)

( * ) Notice: Subject to any disclaimer, the term of this patent is extended or adjusted under 35 U.S.C. 154(b) by 0 days.

(21) Appl. No.: 16/533,899

(22) Filed: Aug. 7, 2019

Related U.S. Application Data

(60) Provisional application No. 62/764,707, filed on Aug. 15, 2018.

(51) Int. Cl.
*H04B 10/548* (2013.01)
*G01C 19/64* (2006.01)

(52) U.S. Cl.
CPC ........... *H04B 10/548* (2013.01); *G01C 19/64* (2013.01)

(58) Field of Classification Search
None
See application file for complete search history.

(56) References Cited

U.S. PATENT DOCUMENTS

| 2007/0041735 | A1* | 2/2007 | Darcie | H04B 10/032 |
| | | | | 398/186 |
| 2007/0127932 | A1* | 6/2007 | Qi | H04B 10/548 |
| | | | | 398/188 |
| 2009/0103931 | A1* | 4/2009 | Grigoryan | H04B 10/60 |
| | | | | 398/202 |

OTHER PUBLICATIONS

Chan et al., "Microwave Photonic Downconversion Using Phase Modulators in a Sagnac Loop Interferometer", Nov./Dec. 2013, IEEE Journal of Selected Topics in Quantum Electronics, vol. 19, No. 6, 8 pages (Year: 2013).*
Li et al., "Vector Signal Generation Using a Polarization and a Phase Modulator in a Sagnac Loop", Sep. 15, 2015, IEEE Photonics Technology Letters, vol. 27, No. 18, pp. 1961-1964 (Year: 2015).*
Y. Li, D. Yoo, P. Herczfeld, A. Rosen, A. Madjar, and S. Goldwasser, "Receiver for a coherent fiber-optic link with high dynamic range and low noise figure," in Int. Top. Meeting Microw. Photon. Tech. Dig., Oct. 2005, pp. 273-276.
Y. Chiu, B. Jalali, S. Garner, and W. Steier, "Broad-band electronic linearizer for externally modulated analog fiber-optic links," IEEE Photon. Technol. Lett., vol. 11, No. 1, pp. 48-50, Jan. 1999.
C. H. Cox, E. I. Ackerman, G. E. Betts, and J. L. Prince, "Limits on the performance of RF-over-fiber links and their impact on device design," IEEE Trans. Microw. Theory Techn., vol. 54, No. 2, pp. 906-920, Feb. 2006.
Y. Li and P. R. Herczfeld, "Novel attenuation-counter-propagating phase modulator for highly linear fiber-optic links," J. Lightw. Technol., vol. 24, No. 10, pp. 3709-3718, Oct. 2006.

(Continued)

*Primary Examiner* — David W Lambert
(74) *Attorney, Agent, or Firm* — Brake Hughes Bellermann LLP

(57) ABSTRACT

A modified Sagnac loop phase-modulated microwave photonic link with a pulsed optical source is disclosed. Unlike a conventional Sagnac loop, the optical phase offset of the loop can be adjusted to quadrature by applying a synchronized modulation signal to an in-loop phase shifting phase modulator. Thereby, it exemplifies the fundamental RF response.

7 Claims, 7 Drawing Sheets

(56) References Cited

OTHER PUBLICATIONS

B. Szafraniec and G. A. Sanders, "Theory of polarization evolution in interferometric fiber-optic depolarized gyros," J. Lightw. Technol., vol. 17, No. 4, pp. 579-590, Apr. 1999.
E. H. W. Chan and R. A. Minasian, "Microwave photonic down-conversion using phase modulators in a sagnac loop interferometer," IEEE J. Sel. Topics Quantum Electron., vol. 19, No. 6, pp. 211-218, Nov. 2013.
W. Li and J. P. Yao, "Dynamic range improvement of a microwave photonic link based on bi-directional use of a polarization modulator in a Sagnac loop," Opt Exp., vol. 21, No. 13, pp. 15692-15697, Jul. 2013.
W. Du and J. Yao, "Photonic generation of microwave waveforms based on a polarization modulator in a Sagnac loop," J. Lightw. Technol., vol. 32, No. 20, pp. 3637-3644, Oct. 15, 2014.
R. Li, X. Han, X. Chen, and J. P. Yao, "Vector signal generation using a polarization and a phase modulator in a Sagnac loop," IEEE Photon. Technol. Lett., vol. 27, No. 18, pp. 1961-1964, Sep. 15, 2015.
Y. Gao, A. Wen, L. Liu, S. Tian, S. Xiang, and Y. Wang, "Compensation of the dispersion-induced power fading in an analog photonic link based on PM-IM conversion in a sagnac loop," J. Lightw Technol., vol. 33, No. 13, pp. 2899-2904, Jul. 1, 2015.

\* cited by examiner (Fig. 1 of Balanced Photodetection, available at https://www.rp-photonics.com/balanced_photodetection.html )

PULSED SAGNAC LOOP PHASE-MODULATED MICROWAVE PHOTONIC LINK

CROSS-REFERENCE TO RELATED APPLICATIONS

This application claims priority to U.S. Provisional Patent Application No. 62/764,707, entitled PULSED SAGNAC LOOP PHASE-MODULATED MICROWAVE PHOTONIC LINK, filed Aug. 15, 2018, which is incorporated herein by reference in its entirety and for all purposes.

STATEMENT REGARDING FEDERALLY SPONSORED RESEARCH OR DEVELOPMENT

This invention was made with U.S. Government support from the U.S. Air Force Office of Scientific Research under Grant FA9550-12-1-0194. The U.S. Government has certain rights in the invention.

BACKGROUND

This invention relates generally to Microwave photonic links, and, more particularly, to Microwave photonic links having a modified Sagnac loop phase modulated link receiving a pulsed optical source.

Microwave photonic links are desirable for transporting RF signals. Most microwave photonic links employ intensity modulation and direct detection (IM-DD) due to its simplicity and wide bandwidth. However, the IM-DD link requires a modulator bias control, and suffers from laser relative intensity noise (RIN). In comparison, the phase modulated (PM) microwave photonic link has lower insertion loss, and can conveniently apply balanced photodetection to mitigate the laser RIN. Nonetheless, a PM microwave photonic link is extremely sensitive to environment perturbation, which is a major problem that hinders its wide adaptation.

On the other hand, the Sagnac loop topology has been widely adopted in optical gyros to mitigate the random optical phase perturbation. The Sagnac loop contains clockwise (CW) and counter-clockwise (CCW) propagating signals. Both share identical physical transmission media. Therefore, they experience identical random optical phase fluctuations that mutually cancel at the output. The main obstacle of applying Sagnac loop to the PM links is the fact that two optical paths are exactly identical. As a result, it is an optical interferometer inherently biased at zero-degree phase offset, where the fundamental RF modulation response is completely suppressed. Thus, previously, the Sagnac loop topology was applied to a PM microwave photonic link with frequency down-conversion, where the loop phase offset was fixed at zero degree. Recently, microwave photonic link transmitters were realized with help of either a polarization modulator or a phase modulator inside a Sagnac loop. In these implementations, the optical signals from the transmitters contain optical intensity modulation and are fed to a remotely located photodetector by one fiber-optic link.

There is a need for a Sagnac loop PM link with a pulsed optical source that can achieve an arbitrary phase offset to the two counter propagated optical waves.

There is a further need for a Sagnac loop PM link with a pulsed optical source where the link exemplifies the fundamental RF response.

BRIEF SUMMARY

A Sagnac loop PM link with a pulsed optical source that can achieve an arbitrary phase offset to the two counter propagated optical waves is disclosed below. A Sagnac loop PM link with a pulsed optical source where the link exemplifies the fundamental RF response is also disclosed below.

In one or more embodiments, the microwave photonic link of these teachings includes a circulator receiving an optical pulsed signal, an optical coupler, the optical coupler being a 2×2 optical coupler; two ports labeled as input ports and two other ports labeled as output ports, the optical coupler having one input port connected to the circulator, a phase shifting optical phase modulator, one output port of the optical coupler being connected to one terminal of the phase shifting optical phase modulator, a signal applied to the phase shifting optical phase modulator being synchronized to the optical pulsed signal, a second optical phase modulator, a first optical fiber connecting another terminal of the phase shifting optical phase modulator to one terminal of the second optical phase modulator, a second optical fiber connecting another output port of the optical coupler to another terminal of the second optical phase modulator, the connection from the one output of the optical couplers to another output port of the optical coupler constituting a Sagnac loop, clockwise optical signals traveling from the other output port of the optical coupler to the one output port of the optical coupler, counterclockwise optical signals traveling from the one output port of the optical coupler to the other output port of the optical coupler, the circulator also being optically connected to one optical input of a balanced detector, the one input of the balanced detector receiving the clockwise optical signals, another optical input of the balanced detector receiving the counterclockwise optical signals.

In one embodiment, the balanced detector comprises a first photodetector and a second photodetector, the first photodetector receiving the clockwise optical signals, the other input port of the optical coupler being optically connected to a second photodetector, the second photodetector receiving the counterclockwise optical signals, an output of the first photodetector being connected to one input port of a 180 degrees hybrid RF coupler, an output of the second photodetector being connected to another input port of the 180 degrees hybrid RF coupler.

Other embodiments and embodiments of the method of these teachings are also disclosed herein below.

For a better understanding of the present teachings, together with other and further objects thereof, reference is made to the accompanying drawings and detailed description and its scope will be pointed out in the appended claims.

DETAILED DESCRIPTION

Figure 1:
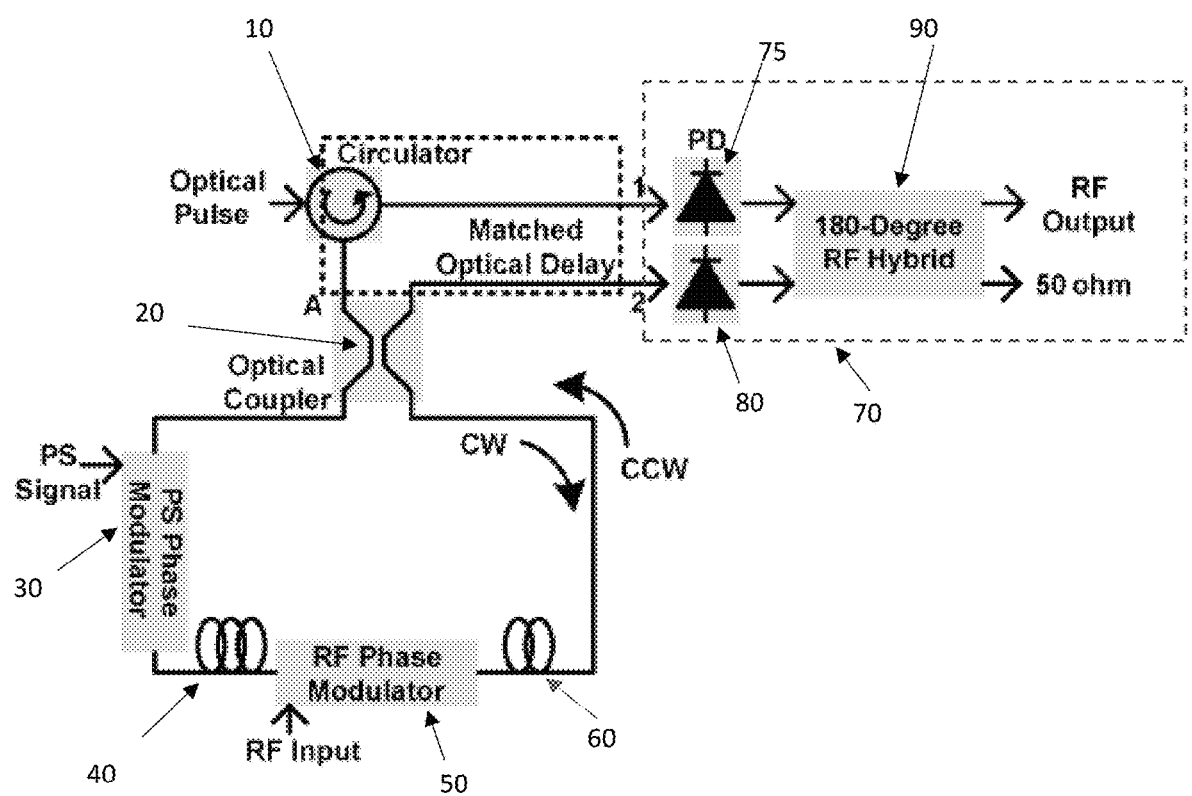
FIG. 1 shows a schematic representation of one embodiment of the microwave photonic link of these teachings.

The following detailed description presents the currently contemplated modes of carrying out these teachings. The description is not to be taken in a limiting sense, but is made merely for the purpose of illustrating the general principles of the invention, since the scope of the invention is best defined by the appended claims.

As used herein, the singular forms "a," "an," and "the" include the plural reference unless the context clearly dictates otherwise.

A Sagnac loop PM link with a pulsed optical source that can achieve an arbitrary phase offset to the two counter propagated optical waves is disclosed hereinbelow. A Sagnac loop PM link with a pulsed optical source where the link exemplifies the fundamental RF response is also disclosed hereinbelow.

In one embodiment, a Sagnac loop phase-modulated microwave photonic link with a pulsed optical source is disclosed. Unlike a conventional Sagnac loop, the optical phase offset of the loop can be adjusted to quadrature by applying a synchronized modulation signal to an in-loop phase shifting phase modulator. Thereby, it exemplifies the fundamental RF response.

In one or more embodiments, the microwave photonic link of these teachings includes a circulator receiving an optical pulsed signal, an optical coupler, the optical coupler being a 2×2 optical coupler; two ports labeled as input ports and two other ports labeled as output ports, the optical coupler having one input port connected to the circulator, a phase shifting optical phase modulator, one output port of the optical coupler being connected to one terminal of the phase shifting optical phase modulator, a signal applied to the phase shifting optical phase modulator being synchronized to the optical pulsed signal, a second optical phase modulator, a first optical fiber connecting another terminal of the phase shifting optical phase modulator to one terminal of the second optical phase modulator, a second optical fiber connecting another output port of the optical coupler to another terminal of the second optical phase modulator, the connection from the one output of the optical couplers to another output port of the optical coupler constituting a Sagnac loop, clockwise optical signals traveling from the other output port of the optical coupler to the one output port of the optical coupler, counterclockwise optical signals traveling from the one output port of the optical coupler to the other output port of the optical coupler, the circulator also being optically connected to one optical input of a balanced detector, the one optical input of the balanced detector receiving the clockwise optical signals, another optical input of the balanced detector receiving the counterclockwise optical signals.

In one embodiment, the balanced detector comprises a first photodetector and a second photodetector, the first photodetector receiving the clockwise optical signals, the other input port of the optical coupler being optically connected to a second photodetector, the second photodetector receiving the counterclockwise optical signals, an output of the first photodetector being connected to one input port of a 180 degrees hybrid RF coupler, an output of the second photodetector being connected to another input port of the 180 degrees hybrid RF coupler.

One embodiment of a pulsed Sagnac loop phase modulated microwave photonic link (see FIG. 1) is disclosed below. The pulsed Sagnac loop phase modulated microwave photonic link contains two in-loop optical phase modulators. One (RF) modulator (50, FIG. 1) is for signal modulation and the other phase shifting (PS) modulator (30, FIG. 1) is for generating non-reciprocal optical phase shift between the two optical paths. The optical input to the Sagnac loop is an optical pulse train. The driving voltage for the PS phase modulator is synchronized with the optical pulse train. The optical pulse trains in the CW and CCW propagation directions shall experience different phase modulation under the PS phase modulator, since the PS modulator 30 is a traveling wave device. As the driving voltage to the PS modulator is synchronized with the pulse train, the time varying phase modulation is equivalent to a DC non-reciprocal optical phase shift. By adjusting the driving voltage for the PS phase modulator, the Sagnac loop can achieve the desired π/2 phase bias to allow maximum modulation efficiency for the RF fundamental frequency. It was also noted that the optical fiber paths (40, 60, FIG. 1) on each side of the RF phase modulator 50 do not need to be symmetric since these fiber paths are inside the Sagnac loop. To cancel the laser RIN by balanced photodetection (70, FIG. 1), only the short fiber paths connecting the optical 3 dB coupler and the balanced PDs 70 need to be length-matched.

In that instance, the schematic diagram of the link is shown in FIG. 1, which consists of a pulsed optical source, a circulator 10, an optical coupler 20, two photodetectors (PD) 75, 80, a 180-degree RF hybrid 90, a PS phase modulator 30 and an RF phase modulator 50. The optical pulse is sent to the Sagnac loop input via the circulator. In FIG. 1, the optical pulse at point A is given by:

$$E_{in}(t) = \sqrt{P} \cdot r(t) \cdot \exp(j\omega_0 t) \quad (1)$$

where $\omega_0$ is the angular frequency of the optical carrier, $r(t)$ is a normalized return-to-zero rectangle function and P is the peak power value of the optical pulse.

The RF and PS phase modulators are inserted in the Sagnac loop. In the Sagnac loop, both the CW and CCW optical signals go through the RF and PS phase modulators. The optical output signals are then sent to the PDs for the square-law detection. The detected photocurrents are expressed as $$I_1 = \frac{1}{2} R_{PD} \cdot |E_{in}(t)|^2 \cdot \{1 - \cos[(\beta_{RF,CCW} - \beta_{RF,CW}) \cdot V_{RF}(t) + (\beta_{PS,CCW} - \beta_{PS,CW}) \cdot V_{PS}(t)]\} \quad (2a)$$

$$I_2 = \frac{1}{2} R_{PD} \cdot |E_{in}(t)|^2 \cdot \{1 + \cos[(\beta_{RF,CCW} - \beta_{RF,CW}) \cdot V_{RF}(t) + (\beta_{PS,CCW} - \beta_{PS,CW}) \cdot V_{PS}(t)]\} \quad (2b)$$

For a conventional Sagnac loop with a continuous-wave optical input, both photocurrents are of a cos(.) function of the RF input, where the fundamental frequency response is completely suppressed. However, with time varying driving voltage to the PS and RF phase modulators, the optical pulses will experience different phase shifts under the PS phase modulator as the velocity mismatch between the microwave signal and the optical signal are not the same in the two directions. If the frequencies of $V_{ps}(t)$ and $V_{RF}(t)$ are sufficiently high, the modulation efficiency in CW direction ($\beta_{RF,CW}$, $\beta_{PS,CW}$) can be ignored.

Figure 2:
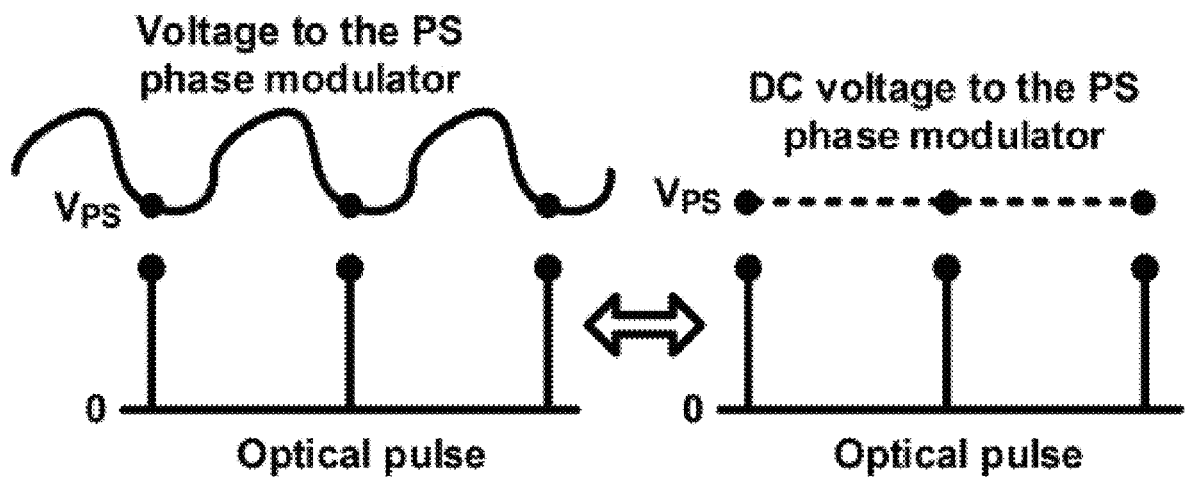
FIG. 2 shows the equivalence, in one embodiment of the microwave photonic link of these teachings, of the phase perturbation on the phase shifting phase modulator to a DC bias term.

In addition, since the optical pulse and the driving voltage on the PS phase modulator are synchronized, the phase perturbation on the PS modulator is equivalent to a DC bias term (see FIG. 2). Therefore, (2) can be greatly simplified as:

$$I_1 = \frac{1}{2} R_{PD} \cdot |E_{in}(t)|^2 \cdot \{1 - \cos[(\beta_{RF,CCW} \cdot V_{RF}(t) + \beta_{PS,CCW} \cdot V_{PS}]\} \quad (3a)$$

$$I_2 = \frac{1}{2} R_{PD} \cdot |E_{in}(t)|^2 \cdot \{1 + \cos[(\beta_{RF,CCW} \cdot V_{RF}(t) + \beta_{PS,CCW} \cdot V_{PS}]\} \quad (3b)$$

Eq. (3) resembles the response of a dual-output Mach-Zender modulator (MZM). By changing the magnitude of the driving voltage of the PS modulator (VPS), the DC optical phase offset can be tuned to 90 degrees to maximize the fundamental RF output. Furthermore, Eq. (3) suggests that the optical pulse train samples the RF input. Thus, in order to avoid unwanted sampling aliasing, the pulse frequency should be at least two times larger than the instantaneous RF bandwidth.

Figure 3:
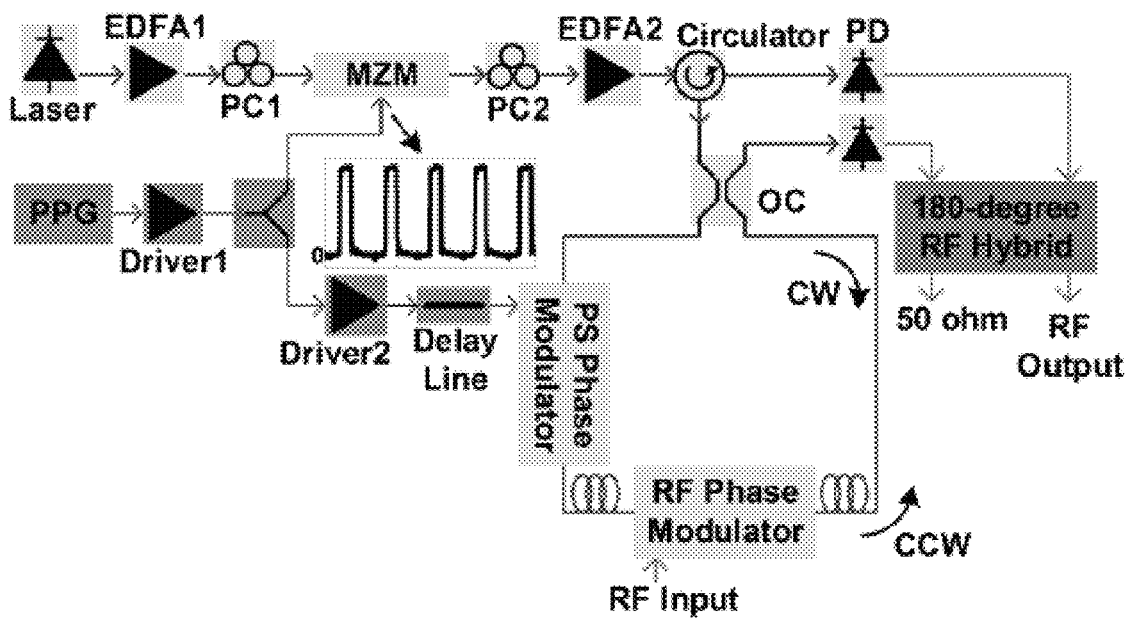
FIG. 3 shows an experimental setup used to verify an embodiment of the microwave photonic link of these teachings.

The above disclosed embodiment of the Sagnac loop PM microwave photonic link was verified using the experimental setup as depicted in FIG. 3. The 1550 nm continuous-wave output from a tunable laser was modulated by an MZM to create the desired optical pulse train. The MZM was biased at its null point and driven by a return-to-zero voltage pulse train that is generated by a pulse pattern generator (PPG). Via an optical circulator, the optical pulse train was launched into a Sagnac loop, which contains an RF and PS optical phase modulator. The circulator's loss is 0.9 dB and the optical coupler's excess loss is 0.3 dB. The phase modulator's insertion loss is 2.5 dB. All photonic components in the experimental system are polarization maintaining. By tuning an RF delay line, the signal applied to the PS modulator is synchronized to optical pulse for the CCW propagating optical fields in the loop.

The PS phase modulator had a half-wave voltage of ~7V. The gain of the PS phase modulator driver (driver2 in FIG. 3) was adjusted to achieve π/2 phase offset between the two propagating optical fields.

Figures 4A, 4B:
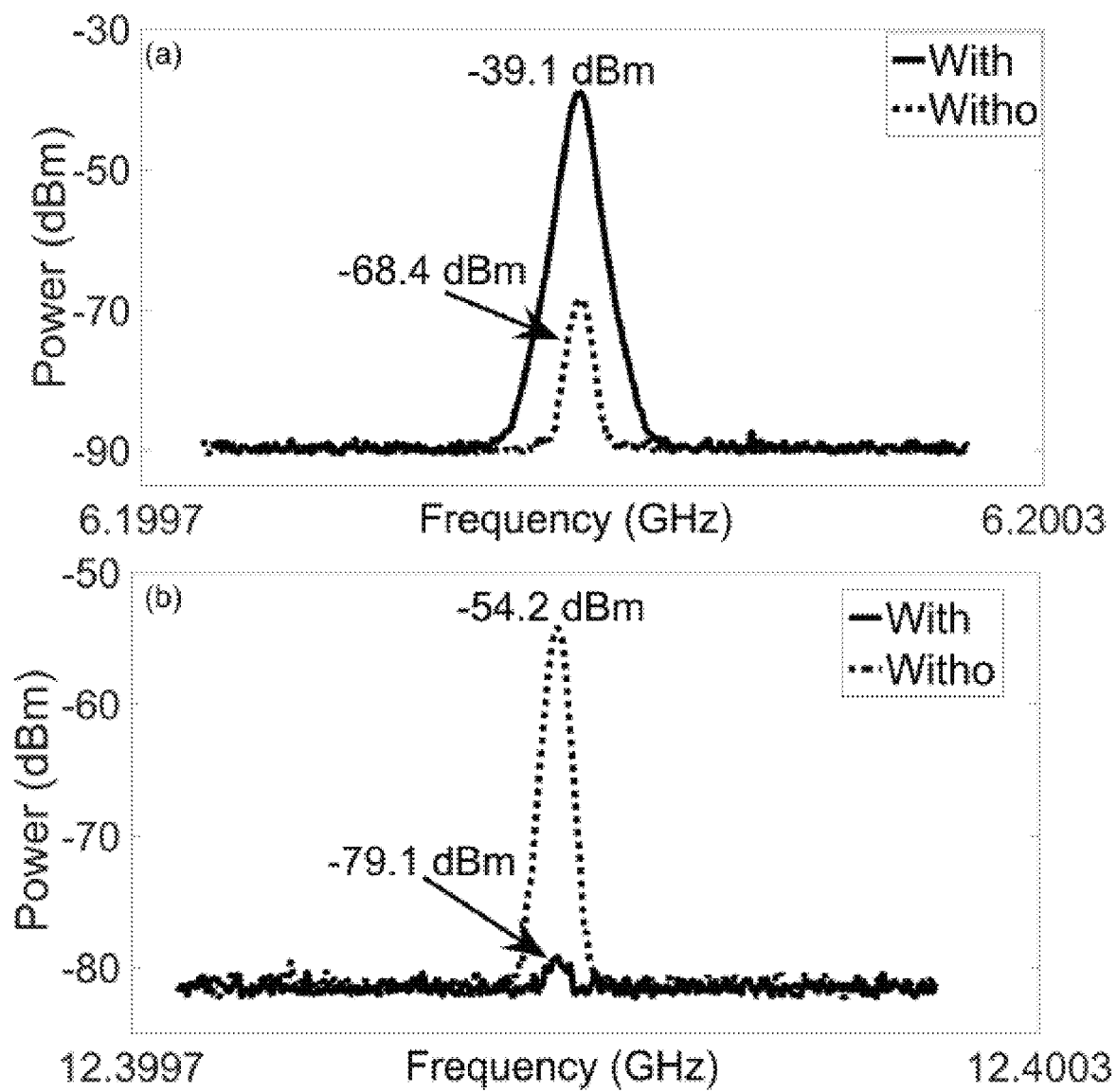
FIGS. 4a, 4b show, for the experimental setup, the measured spectrums of the (a) fundamental and (b) frequency-double tone with and without the driving signal to the PS phase modulator.

First, the fundamental and frequency-double tones at the link output were examined. FIGS. 4a, 4b show an example of the captured spectrums when the RF input frequency is set at 6.2 GHz. The pulse frequency is fixed at 1 GHz. When no signal is applied to the PS phase modulator, the link output is dominated by the frequency-double tone. However, when the synchronized voltage is applied to the PS phase modulator to shift the phase offset to the quadrature, the fundamental tone is increased by 29.3 dB and dominates the link output. In comparison, the frequency-double tone is suppressed by 25 dB.

Figures 5A, 5B:
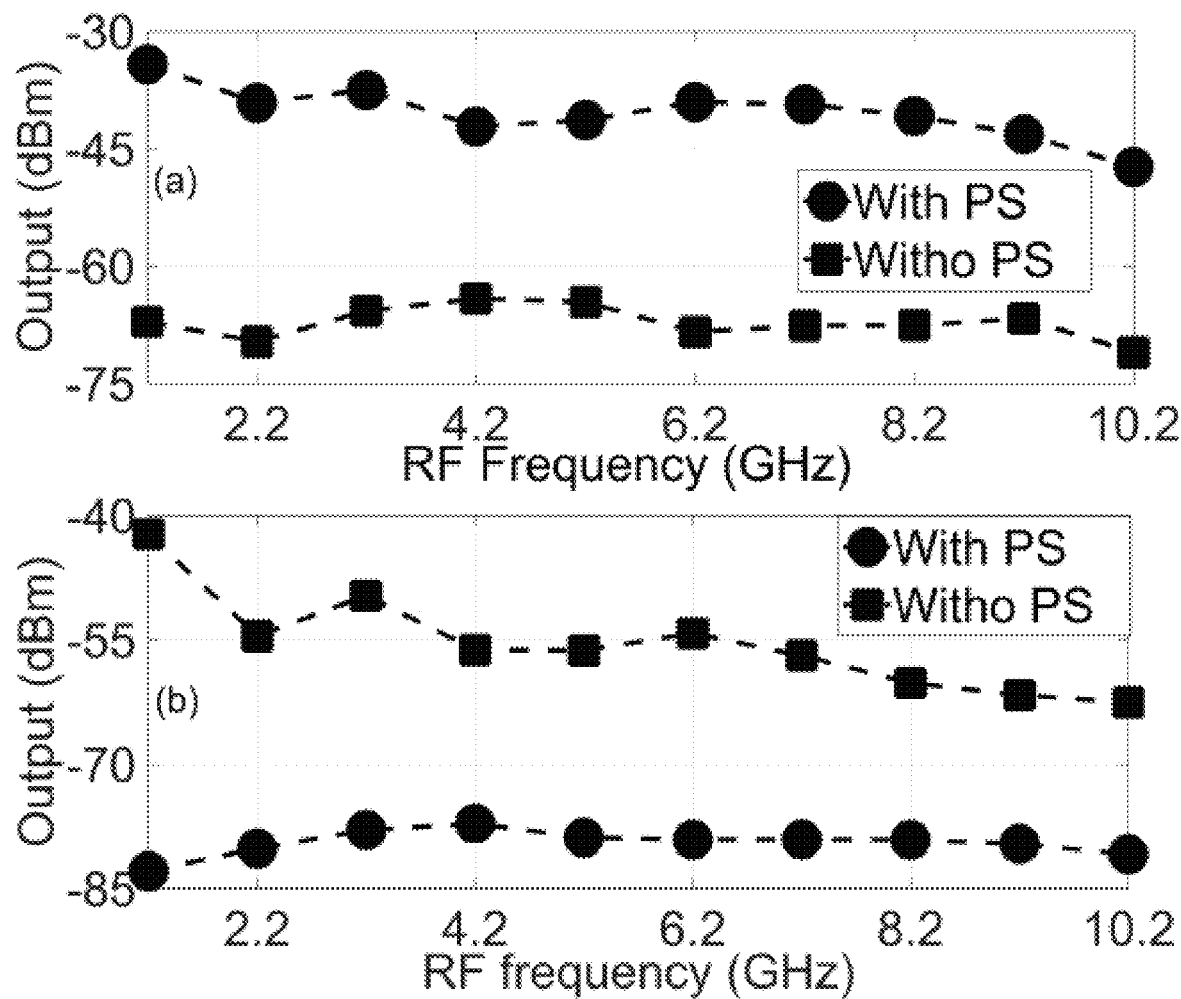
FIGS. 5a, 5b show, for the experimental setup, the measured output power of (a) the fundamental tone and (b) the frequency-double tone with and without the driving signal to the PS phase modulator as a function of the RF input frequency.

FIGS. 5a, 5b show the link output when the RF input frequency is shifted from 1.2 GHz to 10.2 GHz and the optical pulse frequency is also fixed at 1 GHz. A relatively flat frequency response was observed. The optical pulse frequency does not affect the bandwidth of the link's fundamental response.

Figure 6:
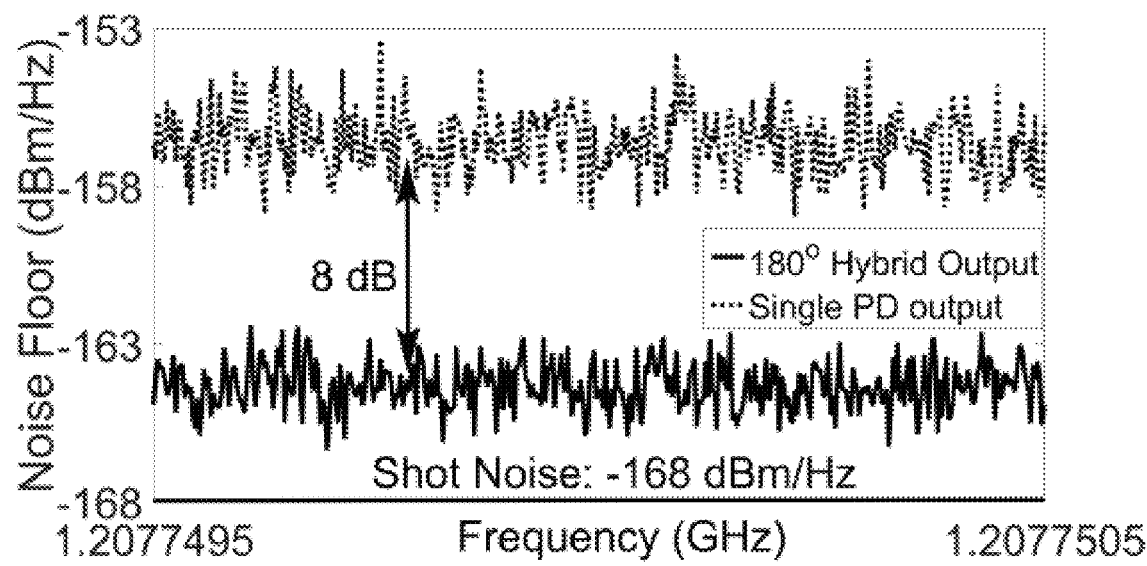
FIG. 6 shows, for the experimental setup, measured noise floors for the 180-degree RF hybrid output and individual PD output.

Next, the link output noise floor was measured. The DC current of each PD was fixed at about 1 mA. The link output noise floor was measured by an RF spectrum analyzer after being amplified 38 dB by two LNAs (Mini-circuits, ZX60-33LN+, 1 dB NF). FIG. 6 depicts the determined noise power spectra density at the link output. The noise power spectra density at the output of the 180-degree hybrid is about −164 dBm/Hz, which is about 4 dB higher than the shot noise floor and about 8 dB lower than that of an individual PD output. This suggests that the balanced receiver contributes to the laser RIN cancellation.

Figure 7:
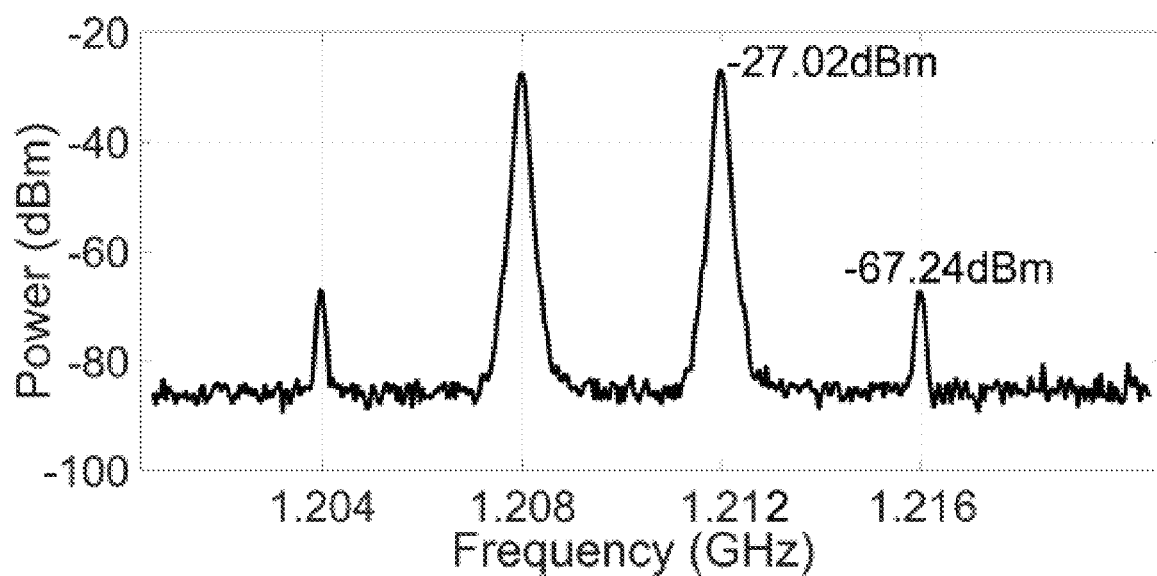
FIG. 7 shows, for the experimental setup, the captured output spectrum when the RF input power is 10 dBm.

A two-tone intermodulation test was then performed to evaluate the linearity of the proposed link. The output spectrum was captured at the 180-degree hybrid output. The DC current for each PD was fixed at 1 mA. The frequencies of the RF input were 1.208 GHz and 1.212 GHz, respectively. FIG. 7 shows a sample of measured output spectrum when the RF input power is 10 dBm and a relative IMD3 of 40.22 dBc was seen.

Figure 8:
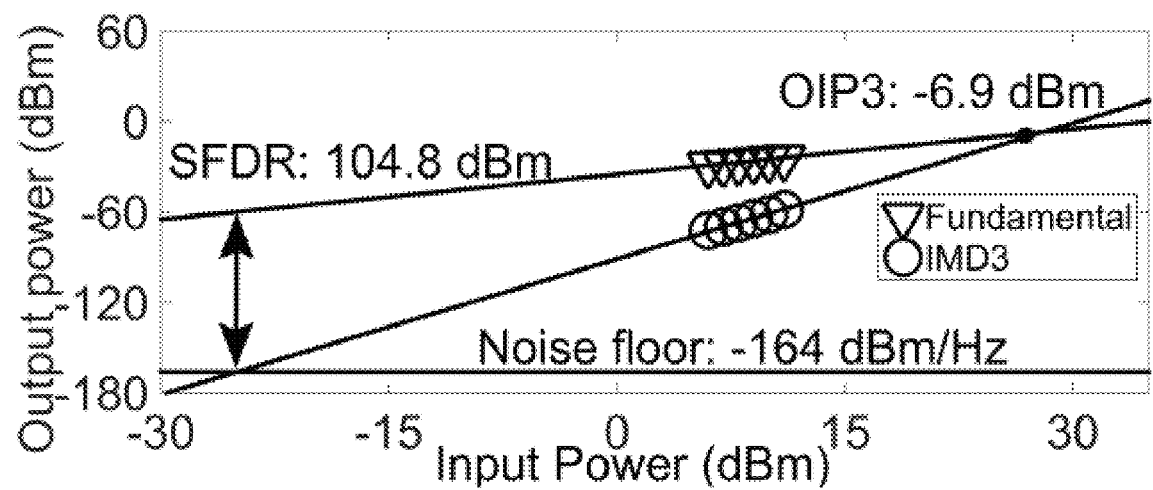
FIG. 8 shows, for the experimental setup, the measured output powers of the fundamental and IMD3 term as a function of the RF input power.

Then, the RF input power was swept from 6 to 11 dBm. As shown in FIG. 8, the IMD3 level has a slope of 3:1; an indication that the link is limited by the third-order non-linearity. The output power at the intermodulation intercept point (OIP3) measured at the 180-degree hybrid output was found to be −6.9 dBm. From the OIP3 and noise floor measurements, the system SFDR was calculated and found to be 104.8 dB·Hz$^{2/3}$ at 1.2 GHz.

Figure 9:
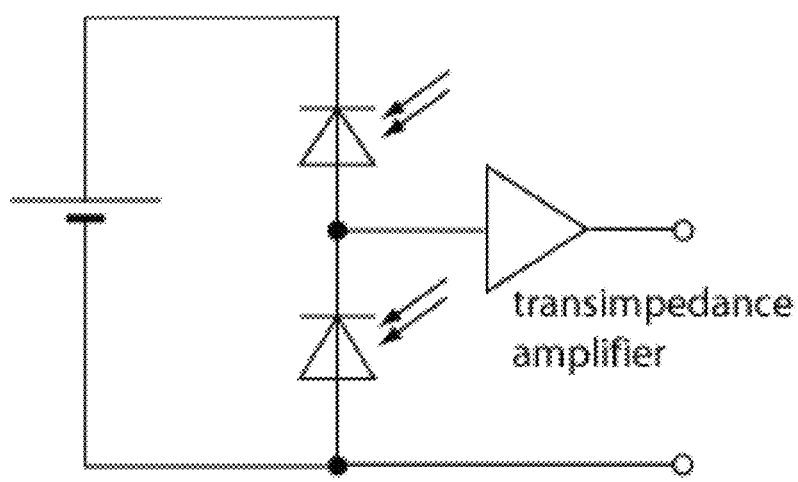
FIG. 9 shows a balanced detector as shown in FIG. 1 of Balanced Photodetection in the RP Photonics Encyclopedia.

Embodiments of the balanced detector (70, FIG. 1) in which the second photodetector (80, FIG. 1) is connected in series with the first photodetector (75, FIG. 1) and an output of the balanced detector is obtained from the point at which the first photodetector and the second photodetector connect, providing a difference in photocurrents (such as shown in FIG. 1 of Balanced Photodetection, available at https://www.rp-photonics.com/balanced_photodetection.html, herein relabeled as FIG. 9), it also within the scope of these teachings.

For the purposes of describing and defining the present teachings, it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Although the invention has been described with respect to various embodiments, it should be realized these teachings are also capable of a wide variety of further and other embodiments within the spirit and scope of the appended claims.

What is claimed is:
1. A microwave photonic link comprising:
   a circulator configured to (i) receive a pulsed optical signal and (ii) provide an optical signal to a first photodetector of a balanced detector; the first photodetector of the balanced detector being configured to receive clockwise optical signals; a second photodetector of the balanced detector being configured to receive counterclockwise optical signals;
   a 2×2 optical coupler having a first input port, a second input port, a first output port, and a second output port, with the first input port connected to the circulator, the first output port and the second output port being connected to form a Sagnac loop such that the clockwise optical signals travel clockwise from the second output port to the first output port and the counterclockwise optical signals travel counterclockwise from the second output port to the first output port;

a phase shifting optical phase modulator having one output port, a first terminal to which the first output port of the 2×2 optical coupler is connected, and a second terminal, the phase shifting optical phase modulator being configured to receive a signal, the signal being synchronized to the pulsed optical signal; and a second optical phase modulator having a first terminal and a second terminal, the first terminal of the second optical phase modulator being connected to the second terminal of the phase shifting optical phase modulator by a first optical fiber, the second terminal of the second optical phase modulator being connected to the second output port of the 2×2 optical coupler by a second optical fiber.

2. The microwave photonic link of claim 1 wherein:
the second input port of the 2×2 optical coupler is optically connected to the second photodetector;
an output of the first photodetector is connected to a first input port of a 180 degrees hybrid RF coupler; and
an output of the second photodetector is connected to a second input port of the 180 degrees hybrid RF coupler.

3. The microwave photonic link of claim 1 wherein the phase shifting optical phase modulator is a traveling wave modulator.

4. The microwave photonic link of claim 1 wherein a signal configured to be received by the phase shifting optical phase modulator is such that a DC optical phase offset of 90° is obtained.

5. The microwave photonic link of claim 1 wherein the optical pulse signal samples a signal applied to the second optical phase modulator.

6. The microwave photonic link of claim 5 wherein a pulse frequency of the pulsed optical signal is at least two times larger than an instantaneous RF bandwidth.

7. The microwave photonic link of claim 1 wherein:
the second input port of the 2×2 optical coupler is optically connected to the second photodetector; and
the second photodetector is connected in series with the first photodetector wherein a difference between a photocurrent from the first photodetector and a photocurrent from the second photodetector provides an output of the balanced detector.

\* \* \* \* \*